(12) United States Patent
Davis

(10) Patent No.: US 11,173,014 B2
(45) Date of Patent: Nov. 16, 2021

(54) MINIMALLY INVASIVE METHOD TO ENHANCE TOOTH MOVEMENT VELOCITY

(71) Applicant: Elliot Davis, New York, NY (US)

(72) Inventor: Elliot Davis, New York, NY (US)

( * ) Notice: Subject to any disclaimer, the term of this patent is extended or adjusted under 35 U.S.C. 154(b) by 390 days.

(21) Appl. No.: 16/435,021

(22) Filed: Jun. 7, 2019

(65) Prior Publication Data

US 2020/0383753 A1    Dec. 10, 2020

(51) Int. Cl.
*A61C 7/08*    (2006.01)
*A61C 7/00*    (2006.01)
*A61C 8/00*    (2006.01)
*A61C 1/14*    (2006.01)

(52) U.S. Cl.
CPC .............. *A61C 7/08* (2013.01); *A61C 1/14* (2013.01); *A61C 1/148* (2013.01); *A61C 7/008* (2013.01); *A61C 8/00* (2013.01)

(58) Field of Classification Search
CPC .. A61C 7/08; A61C 7/008; A61C 1/14; A61C 1/148; A61C 8/00
USPC .......................................................... 433/24
See application file for complete search history.

(56) References Cited

U.S. PATENT DOCUMENTS

| | | | | |
|---|---|---|---|---|
| 9,271,808 | B2* | 3/2016 | Teixeira | A61C 7/00 |
| 2008/0102415 | A1* | 5/2008 | Scott | A61C 7/08 |
| | | | | 433/24 |
| 2010/0082148 | A1* | 4/2010 | Cinader, Jr. | B33Y 80/00 |
| | | | | 700/120 |
| 2011/0007920 | A1* | 1/2011 | Abolfathi | H04R 25/606 |
| | | | | 381/326 |
| 2011/0065060 | A1* | 3/2011 | Teixeira | A61C 3/00 |
| | | | | 433/24 |
| 2013/0123774 | A1* | 5/2013 | Zadeh | A61B 17/16 |
| | | | | 606/39 |
| 2020/0383753 | A1* | 12/2020 | Davis | A61C 1/082 |

* cited by examiner

*Primary Examiner* — Matthew M Nelson
(74) *Attorney, Agent, or Firm* — Brooks, Cameron & Huebsch, PLLC

(57) ABSTRACT

A method for increasing the velocity of at least one moving tooth along a jaw bone, the method including positioning an abrasive bur with a desired diameter between adjacent roots of the at least one tooth in the jaw bone, the abrasive bur being rotatable by a handheld device, rotating the abrasive bur with the handheld device, applying the rotating bur to penetrate the gingiva tissue covering the space between the adjacent roots of the at least one tooth in the jaw to remove a desired amount of gingival tissue and expose the underlying jaw bone, and contacting the bone with the rotating bur to abrasively vibrate the jaw bone adjacent to at least one tooth without drilling through the cortical bone.

17 Claims, 10 Drawing Sheets

222 — positioning an abrasive bur with a desired diameter between adjacent roots of the at least one tooth in the jaw bone, the abrasive bur being rotatable by a handheld device;

224 — rotating the abrasive bur with the handheld device at a desired speed;

226 — applying the rotating bur to penetrate the gingiva tissue covering the space midway between the adjacent roots of the at least one tooth in the jaw to remove a desired amount of gingival tissue and expose the underlying jaw bone; and 228 — contacting the bone with the rotating bur to abrasively vibrate the jaw bone adjacent to at least one tooth without drilling through the cortical bone.

FIG. 2

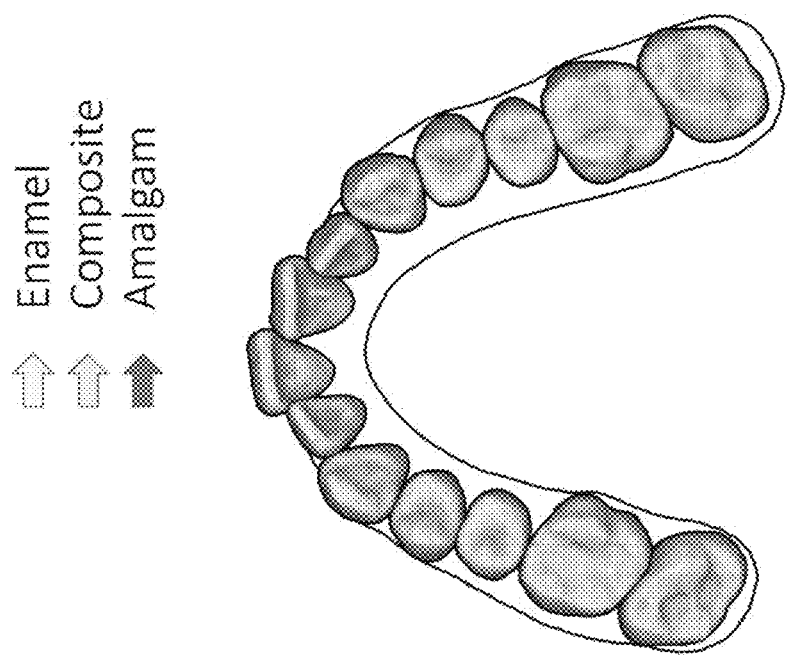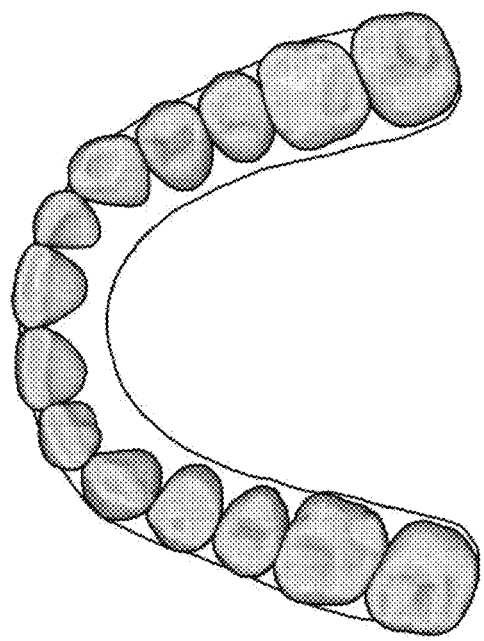
FIG. 7

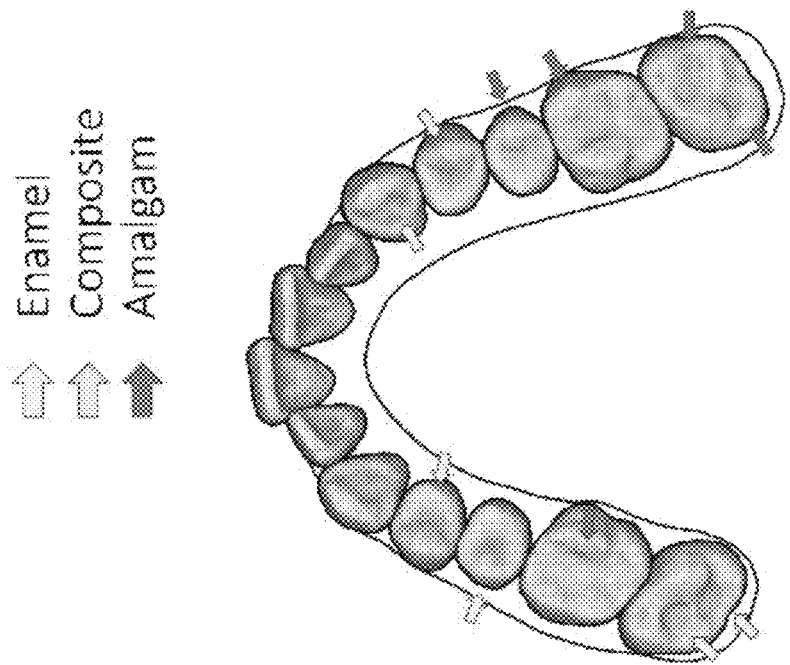
FIG. 8
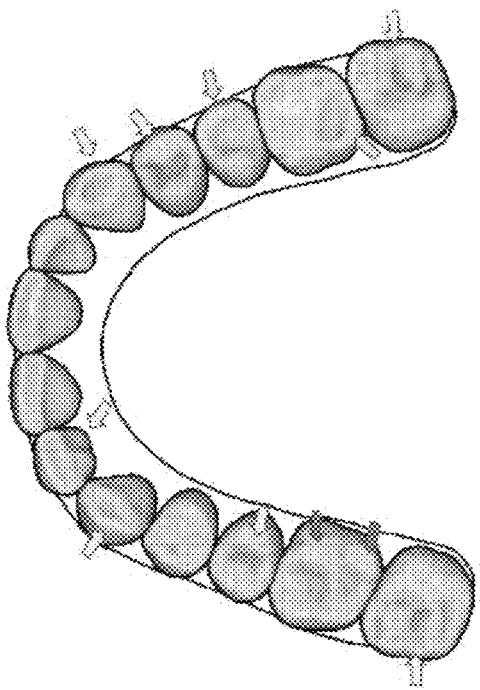

MINIMALLY INVASIVE METHOD TO ENHANCE TOOTH MOVEMENT VELOCITY

INCORPORATION BY REFERENCE

All publications and patent applications mentioned in this specification are herein incorporated by reference to the same extent as if each individual publication or patent application was specifically and individually indicated to be incorporated by reference.

FIELD

The present disclosure relates to dental, periodontal, orthognathic, and orthodontic methods, particularly methods for enhancing tooth movement velocity and implant movement in the jaw of a patient during a dental, periodontal, orthognathic, and orthodontic therapy.

BACKGROUND

Millions of children and adults each year use braces and/or aligners to treat malocclusions (i.e. crooked teeth leading to a poor bite) or skeletal abnormalities or oral health. While a child is growing, their teeth move much easier than an adult's because their bones are less dense. The density of the maxilla and mandible continue to increase until puberty has completed and adulthood is reached.

Unless an adult acquires a disease which weakens their bones (e.g., osteoporosis), they will maintain that level of greater density for decades.

Thus, when an adult decides to have their teeth moved, for whatever reason, the speed at which they can be safely moved is so slow that a treatment can take years. In turn, given the slow rate of movement and the elasticity of movement in the jaw, adult teeth tend to return to their prior sedentary or other undesirable position after they've been moved with braces or aligners. That undesirable result can occur even if a retainer is worn or is attached to multiple teeth. See Kaan M. Madlena M, *Retention and Relapse: Review of the Literature*, Fogorvosi Szemle December 2011, 104(4) pp. 139-146.

Presently, it is also accepted that dental implants, once placed in the mouth, cannot be repositioned.

Additionally, periodontal disease is an ailment with osseous and gingival components for which there are very few treatment options. Further, in some patients, a tooth may be generally more parallel to the plane of the jaw rather than perpendicular and may not erupt as it is not growing toward the surface of the gingiva. The current treatment is the surgical removal of the tooth by cutting into the gingiva and removing the tooth and on occasion some of the bone, with a dental forceps. The prevailing thought is based on the belief that unerupted or partially impacted teeth cannot be made functional in the dentition.

BRIEF DESCRIPTION OF THE DRAWINGS

FIG. 2 describes an implementation of the BAST method on a patient according to embodiments of the present disclosure.

FIGS. 7 and 8 are illustrations of two patient's dentitions showing different types of wear that would benefit from enamel replacement according to an embodiment of the present disclosure.

DETAILED DESCRIPTION

Figure 1:
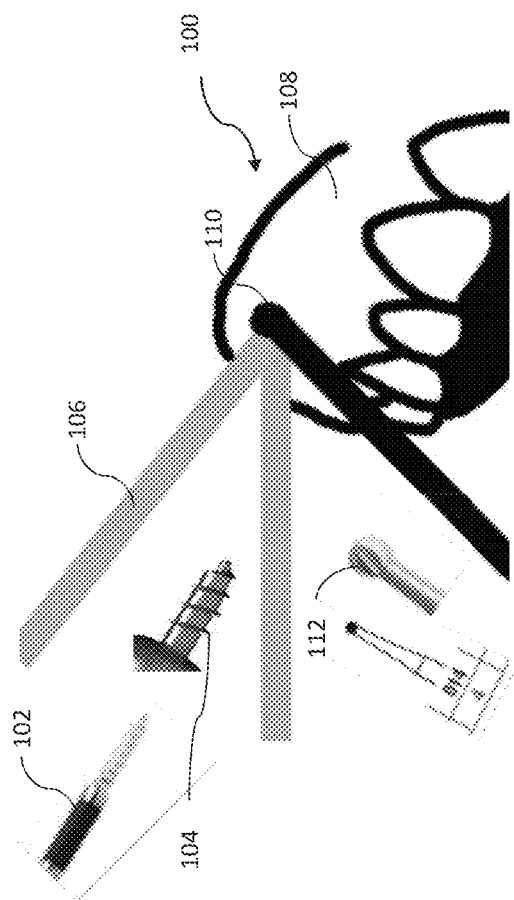
FIG. 1 compares the tools and techniques used in the MOPS screw based method versus the round bur method of embodiments of the present disclosure.

The present disclosure relates to dental, periodontal, orthognathic, restorative, and orthodontic protocols and devices whose intention is to maintain or improve the patient's overall dental, periodontal, orthognathic, or orthodontic health. The improvement to the patient's health status is achieved through judicious tooth movements that foster a positive reformulation of the basal alveolar osseous process in the maxillary and mandibular arches which possess most, if not all teeth. The reformulation of the supportive bone and improved force distribution during function are a couple of the enhancements which help the tooth/bone/bite relationships reduce asymmetry and increase occlusion stability.

Embodiments of the present disclosure provide minimally-invasive bone acceleration surgical therapy (BAST) methods and systems that can be combined with conventional orthodontic systems like braces and aligners. In one embodiment, the concept complements the efficacy of the ART ("Arch Reformulation Therapy") method as outlined in U.S. Pat. No. 9,861,451 (incorporated herein by reference). The ART method allows a patient that is otherwise denied orthodontic therapy to be treated with conventional orthodontic treatment systems like braces and aligners. Systems of the present disclosure will also help patients achieve desirable levels of periodontal health and a more stable occlusion.

It has been conventional thinking that not all patients are deemed responsive to treatment with flexible aligners. For example, according to the websites of major manufacturers of orthodontic flexible aligners, the guidelines for a patient who would be deemed unsuitable would have a condition, such as:

1. Any type, method, or movement indicated as difficult.
2. Centric-relation and centric-occlusion discrepancies.
3. Teeth with short clinical crowns.
4. Arches with multiple missing teeth.
5. Patients whose second molars have not yet erupted.
6. Patients with poor oral hygiene.
7. Patients with active periodontal disease.
8. Doctor cannot confirm a patient is dentally and periodontally stable
9. Patients with dental prosthetics or implants.

Embodiments of the present disclosure can be used on the above conditions that conventionally have not been suitable for treatment.

Another issue, with conventional and removable aligner orthodontic therapy, is relapse. Relapse means that, after the conclusion of orthodontic treatment teeth return to their prior or another maloccluded state. The clinical reasons for relapse are not known and no retention therapy has been proposed to overcome the potential for relapse. See Simon J. Littlewood et al., *Orthodontic Retention: A Systematic Review*, Journal of Orthodontics, Vol. 33, 2006, pp. 205-212.

However, it is theorized by the inventor of the present embodiments, that relapse occurs because standard orthodontic therapy involving tooth repositioning does not properly align the teeth to a sufficient standard where the supportive osseous substructure is maximally reformulated. That may further explain why standard orthodontic therapy has not been able promote the health of gingiva. See Bollen A M Cunha-Cruz J et al., *The Effects of Orthodontic Therapy on Periodontal Health: a Systemic Review of Controlled Evidence*, Journal of the American Dental Association, Vol. 139, April 2008, pp. 413-422.

The efficacy of a method according to the present disclosure may be judged by evaluating the health of the patient's gingiva during each phase of treatment. The following summarizes a qualitative scale for evaluating the health of a patient's gingiva who is receiving treatment according to the present invention.

Level I of Gingival Health has been achieved when, compared to a state prior to the initiation of the treatment:
1) the overall appearance of the gingiva is improved;
2) the gingiva is less inflamed;
3) the gingiva is less red.

Level II of Gingival Health has been achieved when, compared to Level I:
1) the overall appearance of the gingiva has improved;
2) the gingiva is less inflamed;
3) the gingiva is less red;
4) the gingiva has started to mature (is more robust and has become thicker).

Level III of Gingival Health has been achieved when, compared to Level II:
1) the overall appearance of the gingiva has improved;
2) the gingiva is less inflamed;
3) the gingiva is less red;
4) the gingiva has stopped receding or has started to have evidence of growth;
5) the gingiva has maintained a prior level of robustness, of maturation, or has further matured.

Further levels are characterized by further improvement in the health of the patient's gingiva, which can be determined based on the appearance of the gingiva. Preferably, photographic records of the gingiva are obtained throughout the process to help the clinician determine whether a phase in the regimen is concluded.

In conventional orthodontic therapies, the health of the gingiva is not considered a primary indication of the need to initiate orthodontic therapy. Presently, the health of the gingiva is not a criterion used to determine whether standard orthodontic therapy was successful at the conclusion of treatment. See The American Board of Orthodontics *Grading System for Dental Casts and Panoramic Radiographs*, pp. 5-17, March 2011. Additionally, the health of the gingiva is presently not a criterion used to determine whether orthodontic relapse has occurred.

In conventional orthodontic therapies, if a patient presents with active periodontal disease and/or pronounced gingival recession, proceeding with orthodontic therapy is contraindicated. Only after a periodontist or general dentist certifies that the periodontal health of the patient is sufficiently stable to withstand orthodontic therapy will treatment be initiated. According to one aspect of embodiments of the present disclosure, active periodontal disease is an indication, not a contraindication, to the initiation of therapy.

As will be understood by a skilled person upon review of the disclosure, the health of the gingival tissue is a significant indicator of malocclusion, especially chronic malocclusion that will require intervention and correction by an orthodontist, general dentist, periodontist or other dental specialist.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of teeth" can refer to one or more teeth.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

A challenge for clinicians rendering and patients receiving orthodontic and other tooth movement care is to keep the duration of therapy sufficiently short, so the patient stays motivated and compliant until the clinician obtains the desired prescribed results. There are several surgical approaches available which will diminish the time needed to complete traditional and aligner orthodontic care. These procedures vary significantly in a number of areas: invasiveness, discomfort to patient, acceptance by patients, acceptance by clinicians, ease of procedure, predictability of outcome, cost to patient, skill and experience required by clinician for mastery, raw cost per procedure to clinician, effectiveness/longevity, and availability of the treatment by a skilled treatment professional. See Alfawal A M H Hajeer M Y et. al., *Evaluation of piezocision and laser-assisted flapless corticotomy in the acceleration of canine retraction: a randomized controlled trial*, Head and Face Medicine 2018, 14:4

More particularly, Wilckodontics® (Accelerated Osteogenic Orthodontics™ [AOO™]), piezoincisions, and Alveocentesis™ (micro-osteoperforation surgery [MOPS]) are surgeries which increase the rate of tooth movement, which reduce the time needed for a course of orthodontic therapy. These dentally purposed surgical corticotomies intentionally damage and temporarily weaken the bone in healthy patients (e.g., no systemic osseous disease, no uncontrolled periodontal disease, no bisphosphonate treatment) to facilitate tooth movement. See Singh R, et. al., *Wilckdontics: The Periodontal Orthodontics*, Dent J Adv Stud 2018; 6:53-56.

AOO™, which requires a full thickness gingival flap, the largest amount of bone removal and can require bone grafts, is considered the most invasive. Wilckodontics claims that the total time required for orthodontic care is diminished by approximately 75% with AOO.

MOPS relies upon less invasive bone boring and removal of modest amounts of osseous structure from several Propel Orthodontics' ("Propel") devices. Prior to the development of the bone acceleration surgical therapy (BAST) protocol, MOPS was considered the least invasive available option. Propel claims that the total time required for orthodontic care is diminished by approximately 50% with Alveocentesis.

Propel's Excellerator PT® and Excellerator RT® are handheld, tactile-controlled instruments which enhance the efficacy of standard orthodontic appliances and removable aligners via the creation of osteoperforations (boring of holes in the and removal of some bone) between targeted teeth. Those holes bored in the bone amplify the unaided inflammatory orthodontic response. Propel states the benefit from their devices radiate 6 mm-10 mm from the bored sites, resulting in broad accelerated bone remodeling.

MOPS are considered some of the least invasive of the regional acceleration phenomena (RAP) options. RAP related healing embodies a series of complex physiologic processes which lead to the increase in the rate of bone reformulation. See Teixeira C C, Khoo E, et. al., *Cytokine Expression and Accelerated Tooth Movement*, J Dent Res. 2010; 89:1135-1141.

While each RAP is unique, these procedures are based on the same premise; that one can induce mild traumas to the bone which are sufficiently significant to trigger and amplify the body's healing response. That stimulation will expedite the highly desired remodeling of the basal alveolar osseous process (supportive bone and gingiva). See Camacho A D, Velasquez Cujar S A. *Dental Movement Acceleration: Literature Review by an Alternative Scientific Method*. World J Methodol. Sep. 26, 2014; 4(3): 151-162.

In addition to Propel Orthodontics manual bone drills (Excellerator®, Excellerator RT®) there is an auto-powered device of the Jeil Medical® ("Jeil") Orthonia® power driver ("Orthonia"). Examples of such devices are shown in FIG. 1 to contrast these devices from the round bur device used in the embodiments of the present disclosure.

Jeil manufactures multiple versions of the Orthonia®. The Rocky Mountain Orthodontics™ ("RMO") version has lower ranges of power settings (reduced RPM options at the High, Medium, and Low settings). This Orthonia® is used to place and remove orthodontic-purposed implants that serve as temporary anchorage devices (TADs). TADs provide additional bracing when there are an inadequate number of teeth to sufficiently facilitate the movement of one or more teeth.

The Propel version of the Orthonia® has higher power settings (higher RPM options). According to Propel, the higher RPM options facilitates Alveocentesis™. MOPS are made when a bur with a wood screw thread design burrows into and then is subsequently removed from the bone. Once the bur is inserted to the desired depth, it's unscrewed and the osteotomy (bone hole) has been created.

A 1.6 mm efficient sharp, screw designed bit is used by both Excellerator™ versions and the Orthonia® power driver to penetrate the gingiva, perforate the bone, create the bone holes and remove some bone in the MOPS. The diameter of the hole from the Propel Excellerator™ and Orthonia® screw bur is 1.6 mm. If the bur was inserted or removed in a non-precise manner, the diameter of the hole left in the bone would likely be 1.6 mm-2 mm, or larger. The 1 cm bur shaft length will accommodate the recommended gingival/osseous penetration depths of 3 mm, 5 mm, or 7 mm.

Turning now to the inventive concept, the charts below illustrate the size of the holes bored in the patient's maxillary and mandibular arches when using conventional microinvasive procedures (e.g., MOPS) versus the innovative nano-invasive approach disclosed here in.

| Diameter of Screw v. Bur | Depth of Screw v. Bur | Volume of Bone Volume Removed by MOPs v. compacted by the present concept | Procedure Description | Technique |
|---|---|---|---|---|
| 1.6 mm | 3 mm | 6 mm² | Micro-invasive | MOPS |
| 1.6 mm | 5 mm | 10 mm² | Micro-invasive | MOPS |
| 1.6 mm | 7 mm | 14 mm² | Micro-invasive | MOPS |
| 1.4 mm | 1.4 mm | 2.8 mm² | Nano-invasive | BAST |
| 1.4 mm | 2 mm | 4 mm² | Nano-invasive | BAST |

Volume of bone removed via MOPS v. the bone compaction by BAST.

| Procedure | Range of Volume of Osteotomy | Difference In Bone Volume Removed/Compacted | % Difference In Bone Volume Removed/Compacted | |
|---|---|---|---|---|
| MOPS | 6 mm²-14 mm² | 3 mm²-11.2 mm² | 150%-500% | Micro-invasive |
| BAST | 2.8 mm²-4 mm² | 2 mm²-4 mm² | 20%-67% | Nano-invasive |

FIG. 1 compares the tools and techniques used in the MOPS screw based method versus the round bur method of embodiments of the present disclosure. As shown in FIG. 1, the closest prior technique employs a long screw 102 with a screw shaped head 104 to bore deep holes through the gingiva 108 and into the bone which may weaken the structure of the bone such that it may take a significant period of time for the bone to heal. However, in order to achieve such deep penetration, the screw device interacts with the surface of the bone at a large angle to the bone's surface (e.g., 80-135 degrees, shown with the gray lines at 106).

In contrast, the embodiments of the present disclosure utilize a round bur design 110 having a rounded head 112 at a much lower angle (e.g., 0-80 degrees), because the intention of the embodiments of the present disclosure is not to create holes in the bone, but rather, generate vibrations to stimulate tooth movement. The bur is bounced against the bone surface to generate these vibrations. Accordingly, a round inefficient shaped bur at a low angle can be particularly suitable for such a function.

Also, a dull bur may be preferable in some implementations to reduce the likelihood of compaction of bone material from the bone. Using the techniques of the present disclosure, an indent in the bone may form, but this is due to the bouncing action of the bur against the bone and the resultant compaction of the bone material. Accordingly, the bur may not penetrate the bone surface, but rather deforms the surface at the point where the bone is compacted. In this manner, there is little to no loss of bone material due to the embodiments of the present disclosure. A deformity is created without an accompanying modification of the density of the osseous substructure.

As discussed briefly above, the angle of penetration during a micro-invasive MOPS is preferably 90°, perpendicular to the gingiva or surface of the bone. With angles of penetration such as 90 degrees or 135 degrees to the bone surface with a sharp screw threaded bur, these techniques are efficient at boring deep holes. This will facilitate both the swift unimpeded entry into the bone and removal of cut bone as the bur is removed from the site.

With BAST, the angle of interaction for the BAST nano-invasive procedure is preferably 20-80° but can be as low as 0°.

Further, the known shortcomings of the devices used in the micro-invasive MOPS are:
Post-procedure discomfort/pain that lasts for a few days
Patients can become anxious prior to or during the procedure
Clinician fatigue due to the repetitive nature of creating double digit osteotomies
Reluctance to have a second procedure after the initial surgical experience The embodiments of the present disclosure have none of the above shortcomings. The low angle gingival penetration diminishes the cutting efficacy of a round bur (which is beneficial as little to no cutting is desired in the embodiments of the present disclosure), promotes vibrations at the osseous surface, and slows the rate of entry into the bone. Further, embodiments of the present disclosure can be useful in areas, such as the following:
1. Absence of canine guidance
2. Anesthesia required for oral prophylaxis or periodontal maintenance
3. Anterior crossbite
4. Dental age exceeds chronologic age
5. Detectable wear of amalgam, composite, dentin, or enamel
6. Endodontic therapy—multiple teeth
7. Extractions from or due to prior orthodontic care
8. Fractured teeth (active or prior history)
9. Frequent biting of the cheek and/or lip
10. Gingivitis
11. Golf ball dimpled molars
12. Incisal and/or occlusal wear
13. Irregular Curve of Spee
14. Irregular Curve of Wilson
15. Lingual fixed retainer and occlusal disease
16. Multiple marginal ridges or cusps with craze lines
17. Midline discrepancy (one or both arches)
18. Midline accommodation shift upon opening is symptomatic
19. Mouth breather
20. Movement of an ankylosed tooth is required
21. Multiple abfractions
22. Multiple chips to restorative materials (e.g., composite, porcelain)
23. Multiple fractures of tooth structure (e.g., cementum, enamel)
24. Multiple irregular incisal edges due to excessive occlusal wear
25. Non-parallel roots (axial inclinations require improvement)
26. Occlusal equilibration (prior history of)
27. Orthodontic therapy (prior history of, presently receiving therapy)
28. Orthognathic surgery (needed or prior history)
29. Periodontal disease (mild or moderate)
30. Periodontal grafting surgery under consideration
31. Periodontal prophylaxis or maintenance more than three times a year
32. Plunging cusp
33. Prolonged sensitivity to cold
34. Posterior crossbite
35. Reposition a slightly misaligned dental implant
36. Roots of teeth: gum shrinking, more root showing, cementum exposed
37. Rotated tooth (>15°)
38. Significant arch asymmetry
39. Sleeping disorder (e.g., sleep apnea)
40. Snoring
41. TMJD (active/prior history of)
42. Toothbrush abrasion
43. Veneers being considered
44. Veneers being replaced with crowns FIG. 1 illustrates an implementation of the BAST method on a patient according to embodiments of the present disclosure. The inventive Nano-Invasive™ BAST methods and systems relieve or greatly reduce the following shortcomings associated with the protocols surrounding the micro-invasive MOPS.

For example, there is no post-procedure discomfort by the second day, so patients do not mind additional procedures when needed. The BAST procedure takes 7-10 minutes, whereas the MOPS procedure takes 12-25 minutes, so there is no clinician fatigue and a significant reduction in the magnitude of patient inconvenience.

FIG. 2 provides a method embodiment of the present disclosure. In this example, the method includes positioning an abrasive bur with a desired diameter between adjacent roots of the at least one tooth in the jaw bone, the abrasive bur being rotatable by a handheld device, at 222. The method also includes rotating the abrasive bur with the handheld device at a desired speed, at 224. At block 226, the method provides applying the rotating bur to penetrate the gingiva tissue covering the space between the adjacent roots of the at least one tooth in the jaw to remove a desired amount of gingival tissue and expose the underlying jaw bone. And the method includes contacting the bone with the rotating bur to abrasively vibrate the jaw bone adjacent to at least one tooth without drilling through the cortical bone, at 338.

Through use of such embodiments, the inventive BAST procedure allows for more than 1 cm of tooth movement to be performed in a predictable manner without surgery (i.e., non-surgical alternatives to elective orthognathic care and dental implant placement). Patients previously told their conditions contraindicated their ability to receive treatment are informed they're eligible for care. Dampened vibrations provide helpful feedback and confirm desired effects are being transmitted to the basal alveolar osseous complex.

The inventive Bone Acceleration Surgical Therapy (BAST) can be defined as a least invasive corticotomy or a nano-corticotomy. Corticotomy means the intentional weakening (or severing) of the supportive bone in the maxilla and/or mandible, whose purpose is to decrease the natural resistance by the osseous substructure (an inherent protection to keep teeth secure in their existing positions) to facilitate purposed (intended) and desirable tooth movements in a predictable manner.

The inventive process can be used with bones of any density. For bones of standard density (e.g., class 2 and/or class 3), the round bur is placed between the projected location of the roots based on the root bulges in the gingiva and their alignment on the x-rays to minimize the likelihood that a tooth root could be inadvertently nicked. The bur can be held atop the bone, for example, resting against a finger of the operator, or a novel positioning device.

For bones of soft density, once the round bur has pierced through the gingiva, it can create a compacted area of (~0.5 mm) to (~1.4 mm) on the surface of the bone. If slight (~0.5 mm) compaction occurs, the bur is held in place to enhance the effect (magnitude and number) of the vibrations. If the compaction is on the larger side of the range (~1.4 mm), the bur can be slightly pulled back and held with a diminished grip so only a portion of the bur is below the nondeformed surface of the bone surrounding the deformed area. The handpiece being held loosely in that position will, facilitate the bouncing of the bur against the bone.

Lastly, when the bone is firm and dense, the operator may need to gently draw back on the bur against the bone to obtain a slight compaction and move forward with the bur on the bone to obtain the desired level of vibration. If the bur has not compacted the bone surface after approximately 20 seconds, a slight amount of alternating back-action and forward pressure should be applied until 0.5 mm to 2 mm compaction of the surface of the bone has occurred.

An example of a BAST procedure can include the following system of components. First, a conventional topical anesthetic is applied by a cotton swab on mucosa which has been dried (e.g., 20% benzocaine, 18% benzocaine+2% tetracaine hydrochloride). Local anesthetic is delivered via anesthetic carpules (e.g., articaine hydrochloride 4% with 1:100,000 epinephrine [1-2 carpules/quadrant]). Second, a conventional implant handheld drill with precise torque and water, for example, a KAVO EXPERTsurg LUX at 9,000 rpm with water level setting I or II on the (I-IV) scale, can be used with a #4 round (1.4 mm diameter) standard or surgical length bur.

A technique for using the above system of components is as follows:
 a. Anesthetize the patient with local anesthetic delivered via:
  i. Multiple infiltration injections to sufficiently anesthetize every tooth
  ii. and/or multiple regional block injections
 b. Gently penetrate the gingiva between the roots of adjacent teeth
  i. Hold the surgical handheld device at a low angle to the surface of the bone so the shank of the rotatable bur is, for example, closer to parallel than perpendicular to the gingiva.
  ii. The bur should swiftly penetrate the gingiva, but not penetrate the bone.
  iii. The angle that the handpiece makes with the buccal gingiva should form an acute angle that is a generally low angle, such as angle in a range of 0°-80° degrees.
  iv. Once the bur has pierced the gingiva, it should hover as gently as possible atop or bump against the bone. Eventually, slight compaction of the bone surface (0.5-2 mm) may occur.
  v. The time range for the bur to be beneath the gingiva and complete vibratory action and removal can be, for example, 5-20 seconds.
  vi. One should hold the bur in a gentle but sufficiently firm manner so the operator can feel some resistance to compaction. Vibrations against the osseous substructure prior to the compaction are beneficial and encouraged.
  vii. As the bur starts to compact the bone, slightly decrease the angle to as low an acute angle as possible during bur removal.
  viii. The handpiece should be held somewhat loosely, not firmly, to facilitate the mild bouncing of the bur and increase the inefficiency of the cutting action.
  ix. The inefficient means of penetration should be embraced as the bur bouncing off the bone in a woodpecker-type motion will provide desirable results.
  x. The greater the magnitude and total number of vibrations will allow significantly smaller nano-invasive compactions to yield comparable, if not superior results to the "micro-invasive" technique which removes significantly larger amounts of healthy osseous structure.

As discussed above, the embodiments of the present disclosure can be used to treat a variety of patient conditions. For example, contrary to conventional practice, a method according to the present disclosure may be employed to treat maloccluded teeth of a patient suffering from a periodontal condition.

Thus, a method according to such an embodiment may be an exclusively non-invasive and non-surgical orthodontic method of re-alignment of maloccluded teeth of a patient with an active periodontal condition, without modification of the patient's teeth, the re-alignment beginning at an initial state of alignment of the teeth and ending at a final state of alignment of the teeth, the final state of alignment of the teeth being closer to an ideal arch than the initial state of alignment.

For example, the method can include an orthodontic treatment regimen, the treatment regimen including configuring a plurality of flexible aligners for the patient, the flexible aligners being configured to re-orient the patient's maloccluded teeth progressively from the initial state of alignment to the final state of alignment based on improvements in the health of the patient's gingiva. The periodontal condition may be indicated by an adverse condition of the patient's gingiva and/or the underlying osseous structure. The adverse condition of the patient's gingiva may be indicated by one of recessed gum line, bleeding, and abnormal periodontal pocket. The adverse condition of the underlying osseous structure may be radiographically diagnosed.

Figure 3:
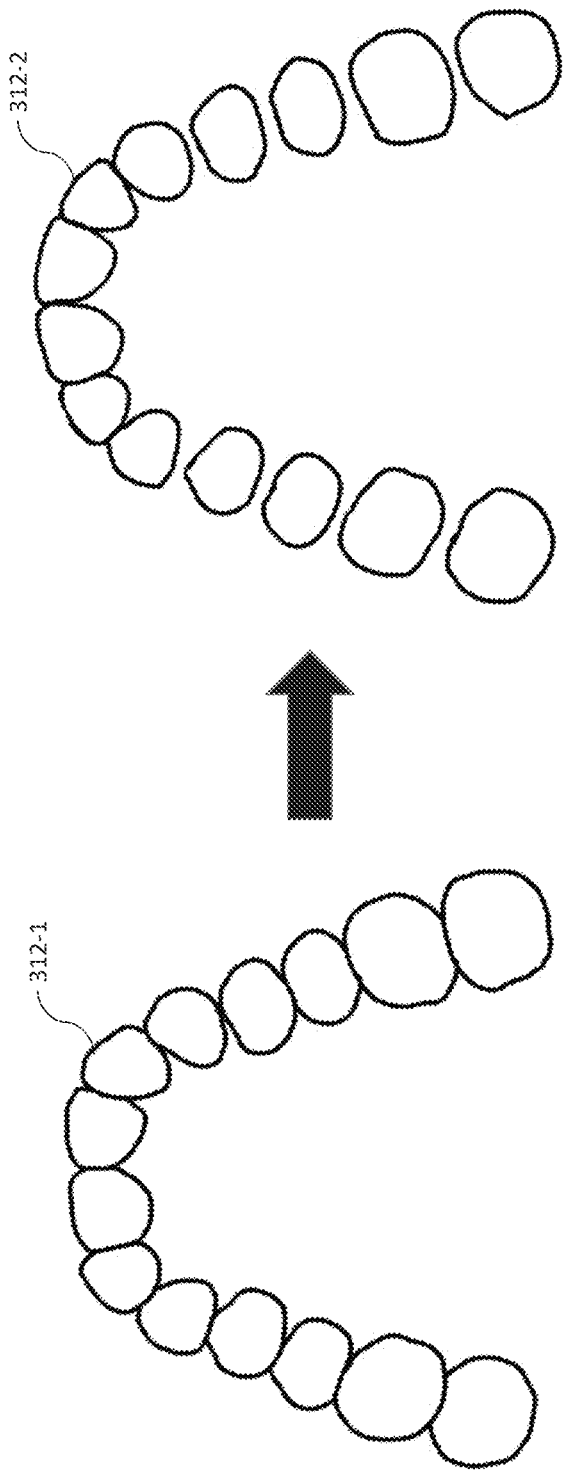
FIG. 3 illustrates a unique tooth positioning arrangement to be used to reduce sleep apnea in patients that can be implemented through use of a method according to an embodiment of the present disclosure.

FIG. 3 illustrates a unique tooth positioning arrangement to be used to reduce sleep apnea in patients that can be implemented through use of a method according to an embodiment of the present disclosure. In such an implementation, the method is used to expand the jaw and space between the teeth of a patient to allow the tongue of the patient to lay flat and open the airway of the patient, especially those diagnosed with sleep apnea.

Shown in FIG. 3 is a potential recommended position of teeth for one suffering from sleep apnea. In this example, the teeth are moved from a close arrangement 312-1 to a more spaced out arrangement 312-2 thereby making more room for the patient's tongue.

The creation of spaces between rear teeth increases the size of the jaw, which increases the size of the floor of the mouth, which increases the volume of space available for the tongue. The creation of spaces between teeth would be contraindicated when occlusion is the sole goal of tooth movement.

Sleep Apnea Solution

The embodiments of the present disclosure can also be utilized to help those suffering with breathing related sleep disorders, such as sleep apnea. When teeth are purposely repositioned to increase the amount of bone supporting the teeth, the corresponding surface volumes of the floor of the mouth and palate are also increased. Those actions create more space for the tongue, as well as decrease the magnitude of the impingement to the tongue. The untreated condition can be so restrictive that indentations of teeth can be clearly seen at the periphery of the tongue. This is the rationale behind the need to include a review of the tongue during the initial comprehensive exam.

The presence of congested teeth in a dentition is not uncommon. The problem posed when there is inadequate room for each and every tooth is that the effected teeth are deprived from possessing ideal circumferential bone support and often have compromised axial inclinations. Teeth with compromised axial inclinations are less likely to contribute to maximum arch stability than those with reasonably normal axial inclinations.

Congested dentitions often have floors of the mouth and maxillary palates of inadequate size. That will commonly leave the tongue with insufficient room and, on occasion, impingement of its periphery. Inadequate room for the tongue can lead to it being involuntarily being pushed posteriorly while breathing, especially when one is asleep. When that happens, part or all of the nasopharynx can be obstructed. The presence of snoring and sleep apnea can be exacerbated. In such cases, a patient's condition should be evaluated based on an examination of the patient. The process could, for example, be as follows:

1. Patient Examination
   a. Review of their medical history
   b. Medical exam
   c. Review of their sleep history
      i. Sleep apnea
   d. Review of their dental history
   e. Dental exam
      i. Periodontal health
      ii. Occlusal evaluation
      iii. Evaluation of enamel and restoration wear (signs of chronic erosion requiring enamel and restoration replacement)
      iv. Caries status
      v. Existing restorations
   f. Temporomandibular joint (TMJ) disorder (TMD) exam
   g. Determination of feasibility and prudency
   h. Tongue exam
      i. Does the tongue possess clearly visible indentations from outlines of multiple teeth?
         1. If yes, determine whether congestion (palatal and/or lingual displacement) of teeth is present in either the bottom, top, or both arches.
         2. If there's congestion present to the extent that adjacent teeth lack adequate proximal contacts, there's insufficient space for each and every tooth.
         3. That's confirmation that, while the volume available for the tongue is insufficient, the potential is there to increase the volume in the floor of the mouth and palate for the tongue.
         4. Patient with this condition would benefit from ART purposed for sleep apnea (or sleep and breathing similar disorders).
      ii. Contraindication for those desiring assistance with sleep disorder (sample):
         1. If no teeth are missing, no teeth overlap, and numerous open proximal contacts exist between teeth, ART-Sleep would be unlikely to yield a sufficient benefit.
2. Digital (e.g., acquire images via scanner) and/or analog (e.g., vinylpolysiloxane [VPS] impressions) recordings
   a. Maxillary and mandibular arches
   b. Registration of the occlusion, how the top and bottom arches mesh
3. Photographic image acquisition
   i. Extraoral images
      1. Frontal
         a. Repose
         b. Smiling
      2. Profile: right side, left side
         a. Repose
         b. Smiling
   ii. Intraoral images
      1. Anterior, Anterior open, Canine, Buccal, Buccal anterior
      2. Quadrants
         a. Occlusal
         b. Buccal
      3. Tongue
         a. in mouth
         b. slightly sticking out
   iii. Inferior views of the above, as indicated
   iv. Maxillary, maxillary anterior, mandibular, mandibular anterior.

FIG. 3 illustrates a unique arrangement of teeth that may reduce or eliminate the symptoms of sleep apnea in some patients. As shown, the teeth are spaced apart, particularly in the rear of the mouth to create more space in the oral cavity for the tongue to lay.

The embodiments of the present disclosure can also be used to move existing implants in the mouth to improve the periodontal status of the implant. This is achieved through judicious tooth movements that foster a positive reformulation of the basal alveolar osseous process in the maxillary and mandibular arches which possess most, if not all teeth. The reformulation of the supportive bone and improved force distribution during function are a couple of the enhancements which help the tooth/bone/bite relationships reduce asymmetry and increase occlusion stability.

Figure 4:
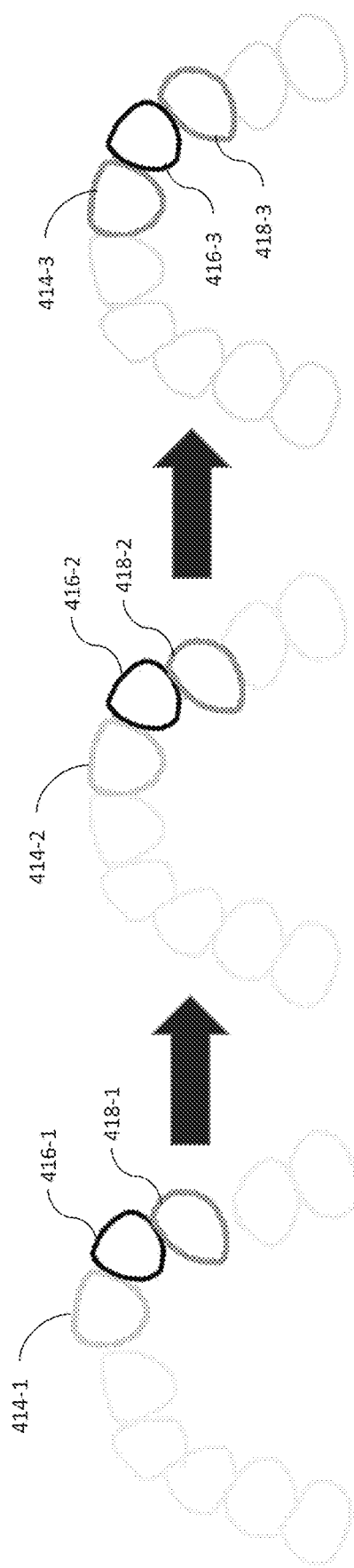
FIG. 4 illustrates a unique implant movement arrangement that can be implemented through use of a method according to an embodiment of the present disclosure.

FIG. 4 illustrates a unique implant movement arrangement that can be implemented through use of a method according to an embodiment of the present disclosure. Presently, when dental implants are present, no movement is planned for that implant tooth. When a dental implant placement is planned to be placed in an arch, the adjacent and/or surrounding teeth are repositioned via orthodontic therapy prior to placement with flexible aligners to improve the likelihood of a successful surgery. Furthermore, it is rare to use non-removable braces to reposition implant teeth as it is thought that such procedure might be ineffectual at best or further damage the malpositioned implant.

While not unintuitive, there are a number of reasons why orthodontic treatment before or after implant placement is rarely performed. For example, prior iterations and attempts with less robust methods have yielded underwhelming, undesirable or unsatisfactory results; clinicians and patients prefer quick fixes, therapies with durations measured in months, not years; implant surgeries, pre-implant surgeries, provisional and transitional restorations have established and accepted protocols. All of these factors direct clinicians away from using flexible aligners, which are thought to take longer than, for example, non-removable braces.

Movement of a dental implant 416 (shown in three positions 416-1, 416-2, and 416-3) can be accomplished using the BAST techniques as follows. Initially, three teeth 414, 416, and 418 (the -1, -2, and -3 indicate three positions for each tooth) are moved together as a group as if they were fused together. Once the implant is in its desired location 416-2, its position is maintained (shown at 416-3) while the two natural teeth (414-2 and 418-2) continue to move to their desired locations (414-3 and 418-3).

With the embodiments of the present disclosure described herein, many patients will benefit from this pre-implant orthodontic/periodontal therapy by requiring a reduced number of dental implants or possibly not needing any dental implants to properly address their edentulous areas and/or chronic malocclusion. When present and appropriate, the translational movement via the mesialization of the second or third molar, as well as the prudent repositioning of all other maxillary and mandibular teeth to idealize the arch forms, may be accomplished as well.

The purpose of these sophisticated and significant (e.g., translational, 3-D) movements is to have the posterior and anterior teeth mesh as well as possible, have the periodontal ligaments be aligned and idealized, which will improve the health of the periodontium. The increased stability at the conclusion of therapy will minimize the likelihood of the canting and non-ideal axial inclinations of teeth which are presently not uncommon results at the conclusion of orthodontic therapy, or which start to occur shortly thereafter, during the relapse phase.

To move an implant with the inventive BAST method, at least one adjacent tooth to the existing implant is moved together with the implant, as if they were splinted together and could not be moved independent of each other. In particular, the method described above can be utilized for moving an existing implant and at least one adjacent tooth in a jaw of a person. It can, for example, include: positioning an abrasive bur with a desired diameter between adjacent roots of the at least one tooth and existing implant in the jaw bone, the abrasive bur being rotatable by a handheld device; rotating the abrasive bur with the handheld device at a desired speed; applying the rotating bur to penetrate the gingiva tissue covering the space between the adjacent roots of the at least one tooth and implant in the jaw to remove a desired amount of gingival tissue and expose the underlying jaw bone; and contacting the bone with the rotating bur to abrasively vibrate the jaw bone adjacent the at least one tooth and implant without drilling through the cortical bone.

In a preferred method, the implant and adjacent teeth are moved as if the implant and at least one adjacent tooth are splinted together and cannot be moved individually. They are moved as a block of teeth along with their surrounding bone.

Once the implant crown reaches a desired location with the adjacent tooth, the implant crown is stabilized in place so that any remaining non-implant teeth can be moved to their desired location. The non-implant tooth or teeth is/are moved by traditional methods, like with braces or aligners, such as the Invisalign™ system, to reach their desired final location(s).

Figure 5:
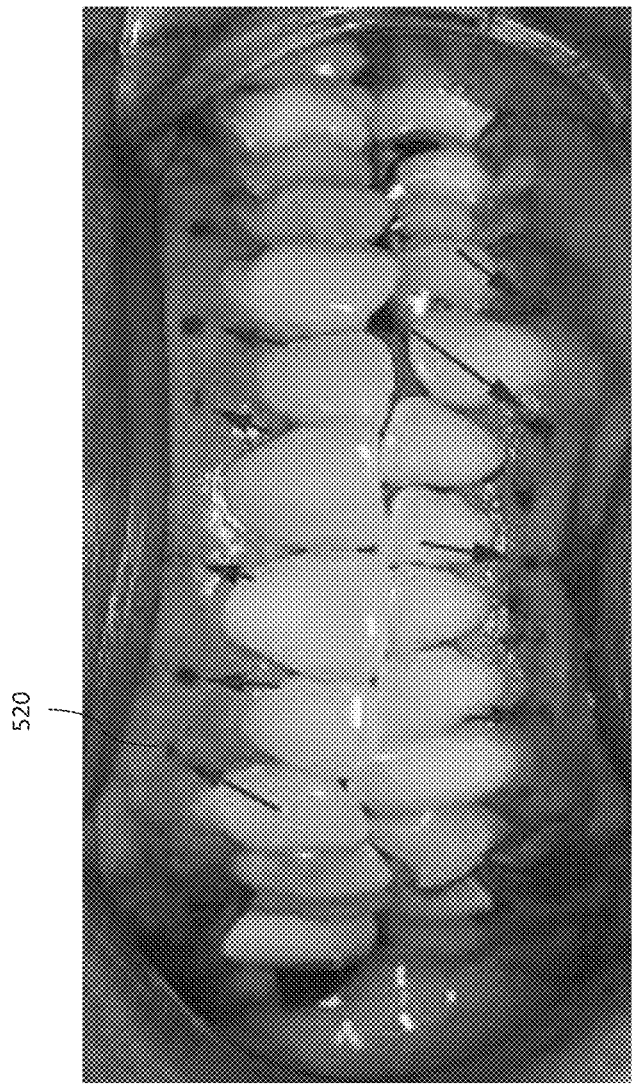
FIG. 5 illustrates the BAST method being performed on an actual patient's gingiva and bone according to an embodiment of the present disclosure.

FIG. 5 illustrates the BAST method being performed on an actual patient's gingiva and bone according to an embodiment of the present disclosure. As shown, the round bur cuts through the gingiva at 520 leaving a spot on the gingiva for a short time, but preferably does not cut into the bone during the BAST procedure.

As mentioned above, there are significant differences and benefits of the inventive nano-invasive BAST protocol for increasing the velocity of a moving tooth over conventional methods. First, a round impact bur vibrates and compacts the surface of the bone while removing, displacing, and/or repositioning a minimal portion or none of the cortical bone surface.

Further, the impact bur does not drill a hole through the cortical bone as practiced by conventional methods, which removes significant bone mass. Thus, the post treatment sensitivity and discomfort is greatly reduced and less taxing on the patient.

Second, the procedural time for the BAST method is significantly shorter. Therefore, the patient experiences less discomfort and anxiety before, during, and after the treatment.

Third, the sputtering, woodpecker-like, action at the osseous surface provides far fewer fatigue-inducing motions on the clinician.

Fourth, water is used when drilling into the gingiva and then the bone, which diminishes the likelihood of trauma to the bone due to overheating and the magnitude and duration of post-op sensitivity.

Fifth, the inventive procedure does not require a protective sheath over the rotating bur of the handheld device as required when a sharp drill bit is used to create a hole through the cortical bone.

Sixth, a round shaped bur with diminished cutting efficiency is less likely to create inadvertent damage to a tooth, filling, cast restoration, implant, gingiva, tooth root surfaces (compared to the risk with a sharp, efficient-cutting, screw threaded bur).

Additionally, the overall improvement in the health of the gingiva can be both quantified (i.e., reduced periodontal pockets) and qualified (i.e., clearly healthier visual appearance—less inflammation, reduced redness). This will substantially improve the patient's satisfaction with the overall dental, periodontal, orthognathic, restorative, or orthodontic treatment procedure.

Enamel Replacement Therapy

A healthy adult oral cavity will possess a stable occlusion, free of signs of malocclusion (occlusal disease), and tooth enamel and dental fillings will not have wear in excess of 1 mm. In that environment, enamel is expected to wear at such a deliberate rate, it is likely to last a lifetime. The projected longevity of dental restorations (direct [i.e., fillings] and indirect [i.e., crowns]) would be at the high end of the range of expectations.

When occlusal disease is present in adults, excessive rates of wear (more than 1 mm) of enamel and dental fillings are not uncommon. On occasion, the enamel will be so severely worn (2+ mm) that the dentin layer becomes visible through the remaining, very thin enamel or becomes completely exposed and unprotected. In that environment, the projected longevity of dental restorations would be at the low end of expectations.

Acute consequences from chronic enamel wear may include but not be limited to; chipped/fractured/cracked teeth or restorations; loose teeth, soreness in the jaw joint (e.g., TMD), increased thermal sensitivity, and discomfort during mastication. Because widespread diminution of enamel and restorations has significant consequences, it is beneficial to have lost portions replaced as swiftly, non-invasively, and affordably as possible.

A current treatment to address enamel and restoration wear espouses the preparation of all the teeth in the arch with indirect fixed restorations. It is not a widely practiced technique because of its shortcomings: it is irreversible, dentally aggressive, and expensive for the patient. It is also not uncommon for subsequent dental care to become necessary (e.g., endodontic therapy, implant surgery) as a direct result of this option.

Replacement of excessive enamel (and dentin) loss and excessively worn restorations can reduce or minimize the likelihood of acute episodes of chronic occlusal disease wreaking havoc on the dentition. When undergoing orthodontic, ART-BAST, or another tooth movement method, enamel replacement will appear to reduce the overall treatment time. One reason for this is the significantly decreased likelihood of an acute dental problem arising which would necessitate a slowdown, pause, or stoppage of tooth movement care.

There is elevated concern for the fate of the occlusion after an orthodontic therapy has been or will be rendered. That is why the coordination or enamel replacement therapy in conjunction with ART-BAST to diminish or eliminate occlusal disease may be beneficial during the ART-BAST processes. When rendered together, ART-BAST and enamel replacement increase the projected longevity, allow for more conservative care, obviate a lot of the risk to compromised restorations, and reduce the overall amount of time required.

Replacement of lost enamel can be essential to long term oral health. While consequences from untreated enamel wear closely mimic consequences from untreated tooth decay, their rates of diagnosis and treatment by skilled dentists are at opposite ends of the spectrum.

Though dentists are highly trained and skilled to diagnose and treat dental caries in a swift and definitive manner, their ability to diagnose and conservatively treat enamel and restoration loss caused by untreated or under-treated occlusal disease is not at that same level of proficiency.

Without digital scans or digitized analog impressions, it is difficult to detect and accurately assess the magnitude of the occlusal topography (enamel and restorative material loss) and whether enamel replacement is warranted.

Other reasons for the lack of widespread replacement of significant enamel and restoration loss are the challenges posed with placing corrective restorations that:
1) May have sub-optimal retentive properties/resistance to dislodging.
2) Will likely wear and chip at an above average rate.
3) Encourage the creation of posterior open bites.
   a. While common with removable aligner therapy, orthodontic precepts consider the creation of a posterior open bite a negative occurrence that one should strive to avoid. ART strives to obtain posterior open bites because discluded states facilitate enamel replacement, help expedite treatment and increase the likelihood of a stable and lasting result.
4) Possess an above average risk for inducing a pulpitis.
5) Invite the establishment of a new occlusion, which poses inherent challenges.
6) Clinicians have not yet been made aware that a novel, predictable, and affordable technique exists.

Arch reformulation therapy's (ART) transient malocclusion (TM) phase opens up a wonderful treatment opportunity window to predictably and safely replace non-carious enamel when the quantity has been significantly diminished (more than 1 mm of enamel has been lost or less than 1 mm of enamel is remaining). Prior to the TM phase, it would likely not be possible to place adequately retentive and conservative (no enamel removed) restorations without severely disturbing the occlusion. enamel replacement (ER) therapy fills this significant treatment void by checking all the boxes in an excellent manner.

Teeth repositioned during ART are often intentionally and significantly discluded to facilitate programmed and desired movements. The failure to replace missing enamel, composite and amalgam is failing to reduce the likelihood that the eventual result will yield a bite, teeth and restorations unlikely to chip, crack, become hypersensitive, possess TMD, etc.

The same movements assessed by orthodontic criteria to be excessive or high risk are considered essential and indispensable for ART-BAST. These dramatic movements facilitate prudent tooth repositioning, obviate the need for and consequences associated with the removal of teeth and/or portions of teeth (interproximal reduction [IPR], occlusal adjustment), and provide an opportunity to conservatively replace missing enamel, composite, and amalgam.

IPR embraces the removal of healthy tooth structure to accommodate the diminished amount of bone present. Unlike IPR, removal of healthy teeth or healthy tooth structure is contraindicated in ART. The precepts of ART-BAST dictate that supportive bone needs to be modified to accommodate the teeth.

Reducing the number of teeth in the dentition or diminishing the size of teeth will reduce the magnitude of the modification of the basal alveolar osseous process, which will inhibit the oral cavity and occlusion from achieving its maximum states of occlusal stability and periodontal health.

Figure 6:
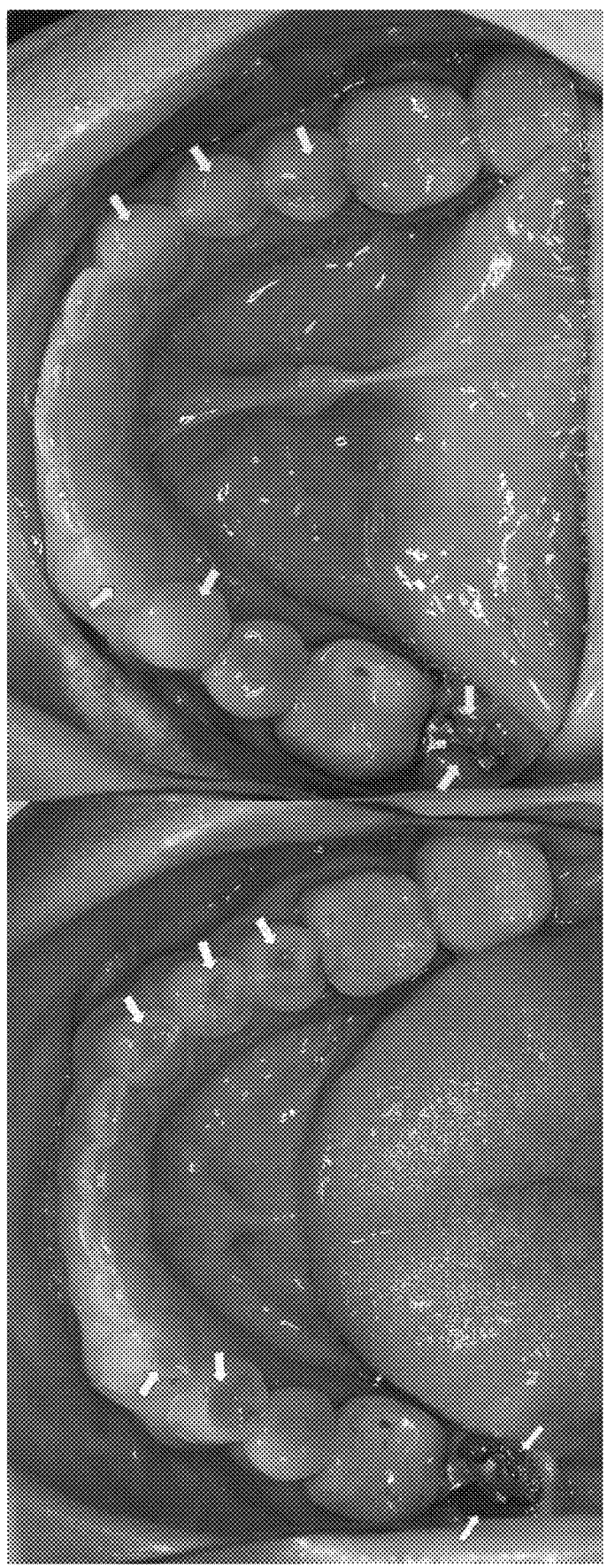
FIG. 6 illustrates the Enamel Replacement method where composite is added to replace missing enamel and restorative material which has been worn down according to an embodiment of the present disclosure.

The photo on the left in FIG. 6 shows a mandibular arch where six teeth have suffered significant enamel and dentin loss. The photo on the right shows the same mandibular arch where those six teeth have had Enamel Replacement therapy performed; atraumatic (no drilling, no anesthetic injection needed) dental composite fillings filled the holes in those teeth.

The disclusion of the bite is common during removable sequential aligner tooth movement therapy. This transient malocclusion (TM) phase provides an excellent opportunity to render enamel replacement (ER) therapy. ER describes the prudent and conservative (no removal of tooth structure required) placement of dental composite restorations to replenish lost and eroded dentin, enamel, composite and amalgam. To facilitate the adherence to existing dental materials, a common intraoral sandblaster with sodium bicarbonate or tin oxide prior to placing an enamel etchant (e.g., 37% phosphoric acid) will sufficiently alter the surface to allow the composite to adhere. The ability to avoid drilling is beneficial by both patients and dentists.

The ability to restore teeth to more closely resemble their desirable or ideal dimensions and have that new occlusal anatomy be incorporated into the subsequent phase of therapy will reduce the time needed for and enhance the likelihood of a stable and lasting result being achieved.

FIG. 7 represents the maxillary arches of two patients. There is clear evidence of wear on the occlusal surfaces of many teeth which appear to have holes, divots, or chips. When topographical examinations of the scanned arches are performed, it is difficult to discern whether the portions requiring replacement are due to missing enamel, composite, or amalgam.

The illustrations in FIG. 8 represent the same maxillary arches as those in FIG. 7. The left images in FIGS. 7 and 8 are for one patient and the right images are for another. The arrows note whether the missing structure is worn enamel, composite, or amalgam. This illuminates the difficulty in discerning whether the excessive structural loss was enamel, dentin, or a dental restorative material when solely viewing the topographical view In FIG. 9, the photo on the left is a maxillary arch. The drawing on the right is the topographical representation of the occlusal view of the same maxillary arch.

Arrows labeled Enamel point to locations where more than 1.5 mm of enamel has been lost. Arrows labeled Composite point to locations where composite fillings have had wear exceeding 1.5 mm. Arrows labeled Amalgam point to locations where silver fillings have had wear exceeding 1.5 mm.

Figure 9:
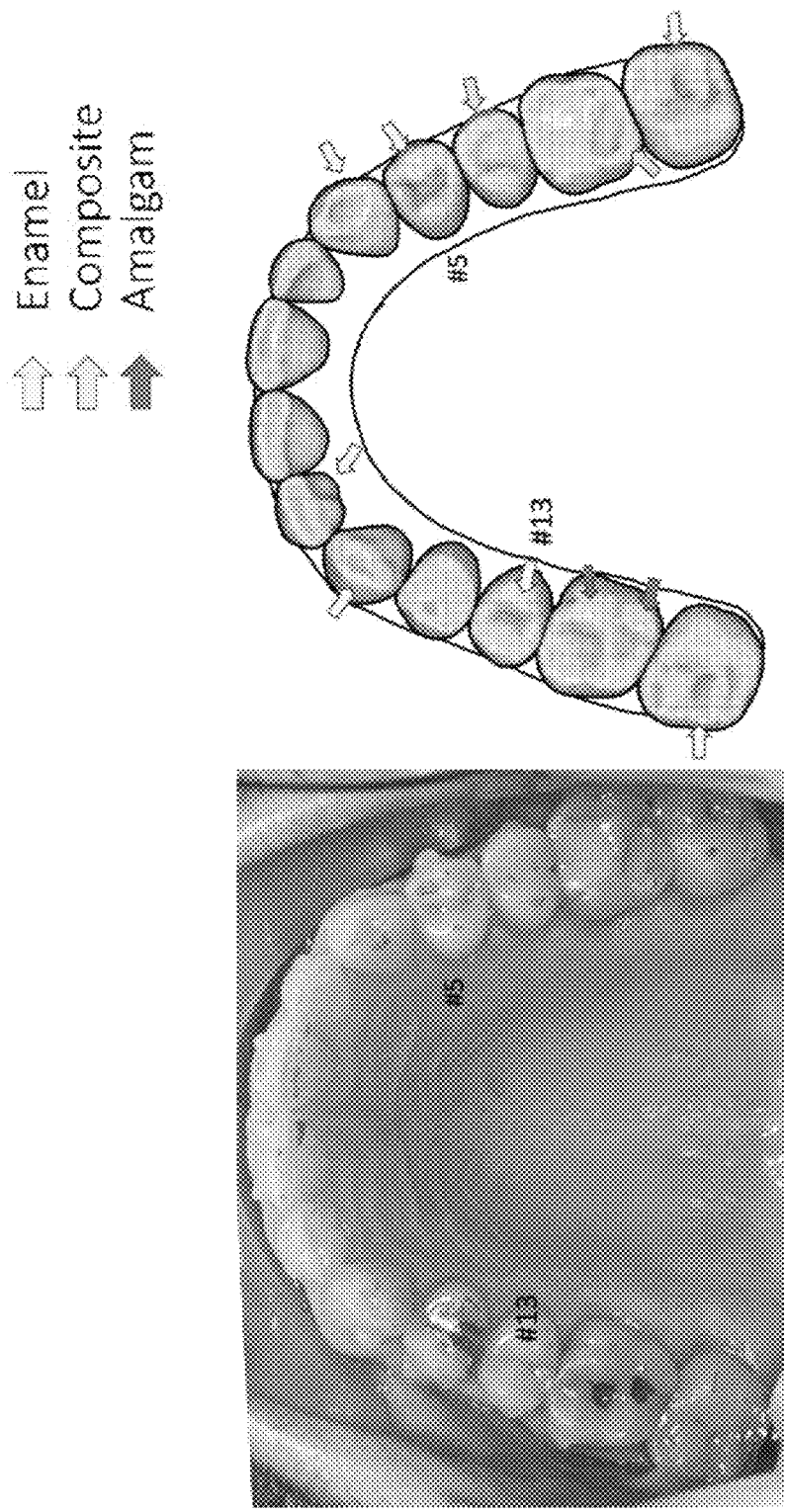
FIG. 9 illustrates an actual condition in the mouth and a topographical depiction according to an embodiment of the present disclosure.

If one wanted to determine if and how much enamel loss was present on teeth #5 & #13 as identified in FIG. 9, they would be greatly aided by incorporating information from both the visual and topographical representations.

Figure 10:
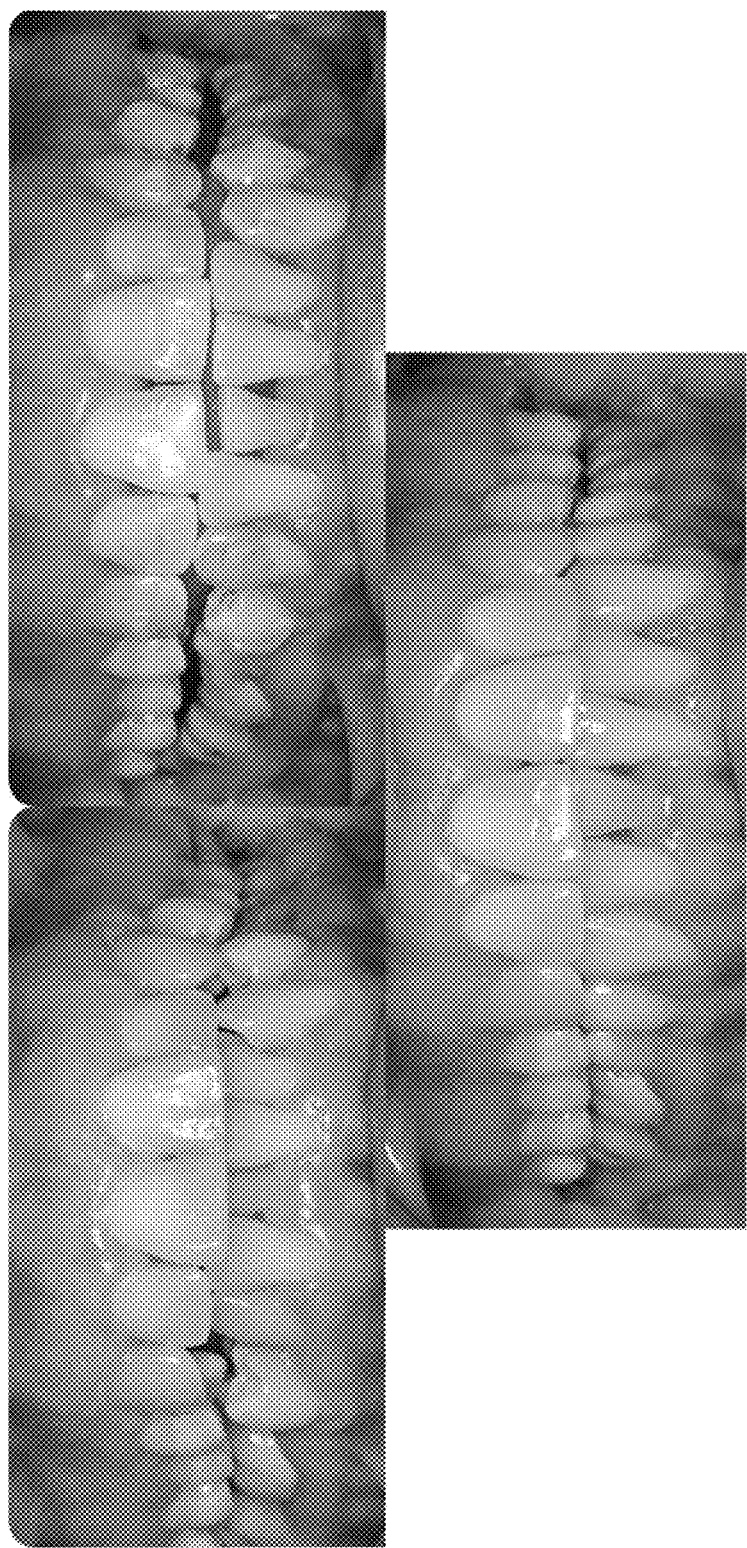
FIG. 10 includes three photos at different stages of treatment according to an embodiment of the present disclosure

The digital topographic representation of the occlusal anatomy helps one gauge the depth of the loss in tooth structure or wear of the restoration. The visual representation confirms it was enamel, composite, or amalgam that experienced the significant wear. FIG. 10 includes three photos at different stages of treatment. The photo on the top left is prior to treatment. The photo on the top right is during treatment. The photo on the bottom is near the end of the active phase of ART-BAST.

The top left photo shows that 30 out of 32 teeth were in contact during centric occlusion prior to treatment. At the end of the first phase of active therapy of her ART-BAST care, 8 of 32 teeth were in contact during centric occlusion. This provides an excellent opportunity to render enamel replacement (ER) therapy because most of the posterior teeth are discluded. Restorations can be placed at their ideal thickness without compromise, without removal of tooth structure because there is more than adequate room available.

ER, in conjunction with ART-BAST will reduce overall treatment time, especially the duration of the passive phases, because the likelihood of a relapsed occlusion will be reduced.

The bottom photo shows 31 of 32 teeth are in contact during centric occlusion at the end of the active phase of ART-BAST.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A method for increasing the velocity of at least one moving tooth along a jaw bone, the method comprising:
    positioning an abrasive bur with a desired diameter between adjacent roots of the at least one tooth in the jaw bone, the abrasive bur being rotatable by a handheld device;
    rotating the abrasive bur with the handheld device;
    applying the rotating bur to penetrate the gingiva tissue covering the space between the adjacent roots of the at least one tooth in the jaw to remove a desired amount of gingival tissue and expose the underlying jaw bone; and
    contacting the bone with the rotating bur to abrasively vibrate the jaw bone adjacent to at least one tooth without drilling through the cortical bone.

2. The method of claim 1, wherein the desired diameter of the abrasive bur is between 1 and 1.6 mm.

3. The method of claim 1, wherein the desired diameter of the abrasive bur is 1.4 mm.

4. The method of claim 1, wherein the step of contacting the bone occurs for between 5 to 20 seconds.

5. The method of claim 1, wherein the step of contacting the bone removes less than 4 mm of bone volume.

6. The method of claim 1, wherein the bur is rotated at a predetermined speed of the rotating bur is between about 8,000 to 10,000 rpms.

7. The method of claim 1, wherein the step of vibrating the bone includes compacting the cortical bone layer of at least one tooth during the vibrating step.

8. The method of claim 1, wherein positioning the abrasive bur includes positioning a shaft of the abrasive bur at a low angle to a surface of the bone.

9. The method of claim 1, wherein positioning the abrasive bur includes positioning a shaft of the abrasive bur at an acute angle to a surface of the bone.

10. The method of claim 1, wherein positioning the abrasive bur includes positioning a shaft of the abrasive bur at an angle to a surface of the bone of 0-80 degrees.

11. A method for increasing the velocity of at least one moving tooth along a jaw bone, the method comprising:
    positioning an abrasive bur with a desired diameter between adjacent roots of the at least one tooth in the jaw bone, the abrasive bur being rotatable by a handheld device;
    rotating the abrasive bur with the handheld device at a predetermined speed;
    applying the rotating bur to a surface of the patient's gingiva tissue to penetrate the gingiva tissue covering the space between the adjacent roots of the at least one tooth in the jaw to remove a desired amount of gingival tissue and expose the underlying jaw bone; and
    contacting the bone with the rotating bur to abrasively vibrate the jaw bone adjacent to at least one tooth without drilling into the cortical bone.

12. The method of claim 11, wherein positioning an abrasive bur includes positioning a dull abrasive bur wherein the abrasive bur is dull such that it will not cut into the cortical bone.

13. The method of claim 11, wherein contacting the bone with the rotating bur includes compacting a surface of the bone due to abrasively vibrating the bone with the rotating bur.

14. The method of claim 11, wherein contacting the bone with the rotating bur includes compacting a surface of the bone by less than 1 mm due to abrasively vibrating the bone with the rotating bur.

15. The method of claim 11, wherein contacting the bone with the rotating bur includes compacting a surface of the bone by less than 4 mm due to abrasively vibrating the bone with the rotating bur.

16. The method of claim 11, wherein positioning the abrasive bur includes positioning a shaft of the abrasive bur at a low angle to a surface of the bone.

17. A method for increasing the velocity of at least one moving tooth along a jaw bone, the method comprising:
   positioning an abrasive bur between adjacent roots of the at least one moving tooth in the jaw bone;
   rotating the abrasive bur;
   applying the rotating bur to penetrate gingiva tissue covering the space between the adjacent roots of the at least one moving tooth in the jaw to remove an amount of gingival tissue and expose the underlying jaw bone; and
   contacting the jaw bone with the rotating bur to abrasively vibrate the jaw bone adjacent to at least one tooth without drilling through a cortical bone.

\* \* \* \* \*